April 20, 1954 O. INGRAM Re. 23,814

DROP END GONDOLA CAR

Original Filed Feb. 14, 1946 6 Sheets-Sheet 1

Inventor

Orville Ingram

By Retter, Meehlen & Meis

Its Attorneys

April 20, 1954 O. INGRAM Re. 23,814
DROP END GONDOLA CAR
Original Filed Feb. 14, 1946 6 Sheets-Sheet 2
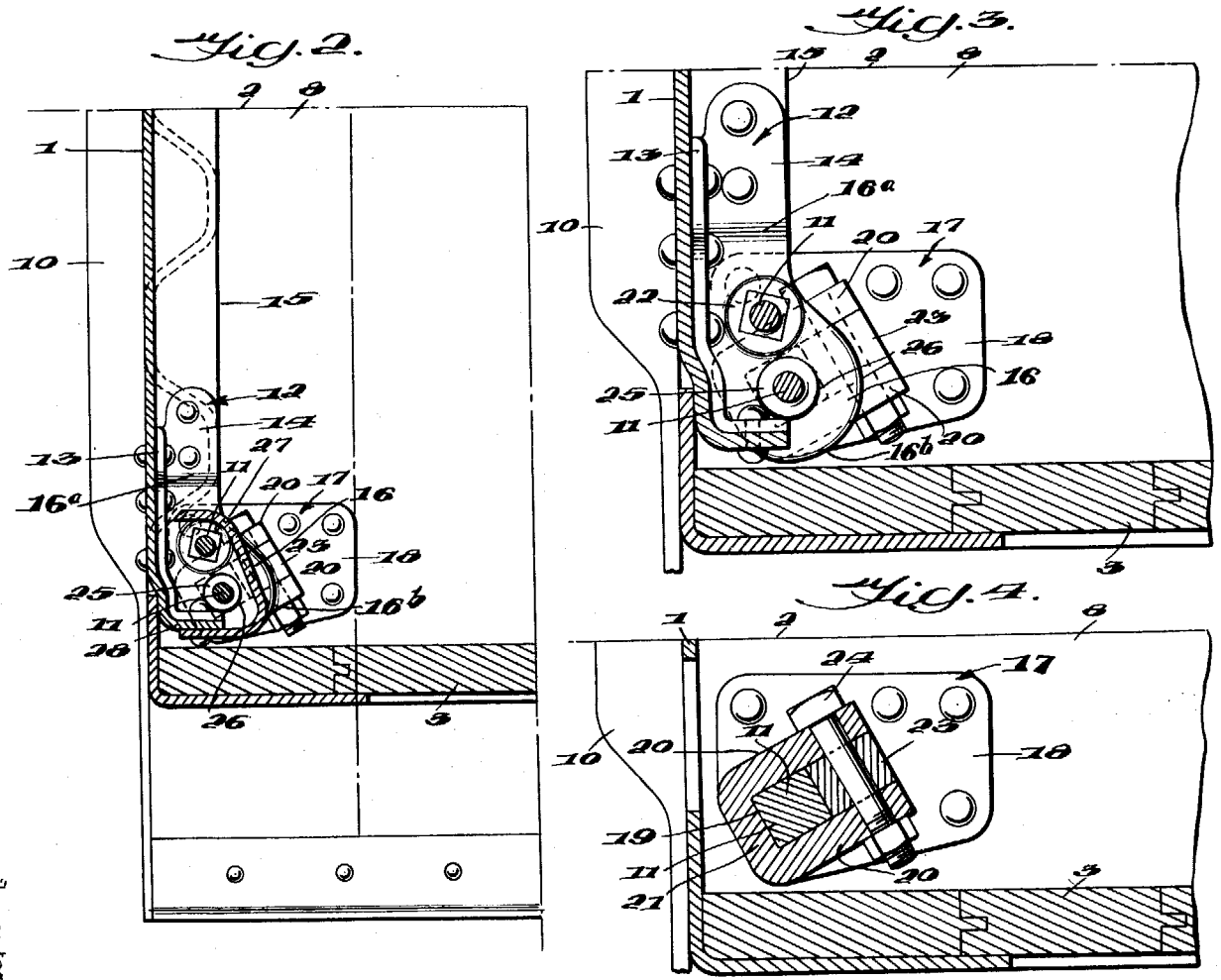
Inventor
Orville Ingram
By Ritter, Meeklen & Muir
his Attorneys April 20, 1954 O. INGRAM Re. 23,814

DROP END GONDOLA CAR

Original Filed Feb. 14, 1946 6 Sheets-Sheet 3

Inventor

Orville Ingram

By Ritter, Meeker & Muir

Their Attorneys

April 20, 1954 O. INGRAM Re. 23,814
DROP END GONDOLA CAR
Original Filed Feb. 14, 1946 6 Sheets-Sheet 4
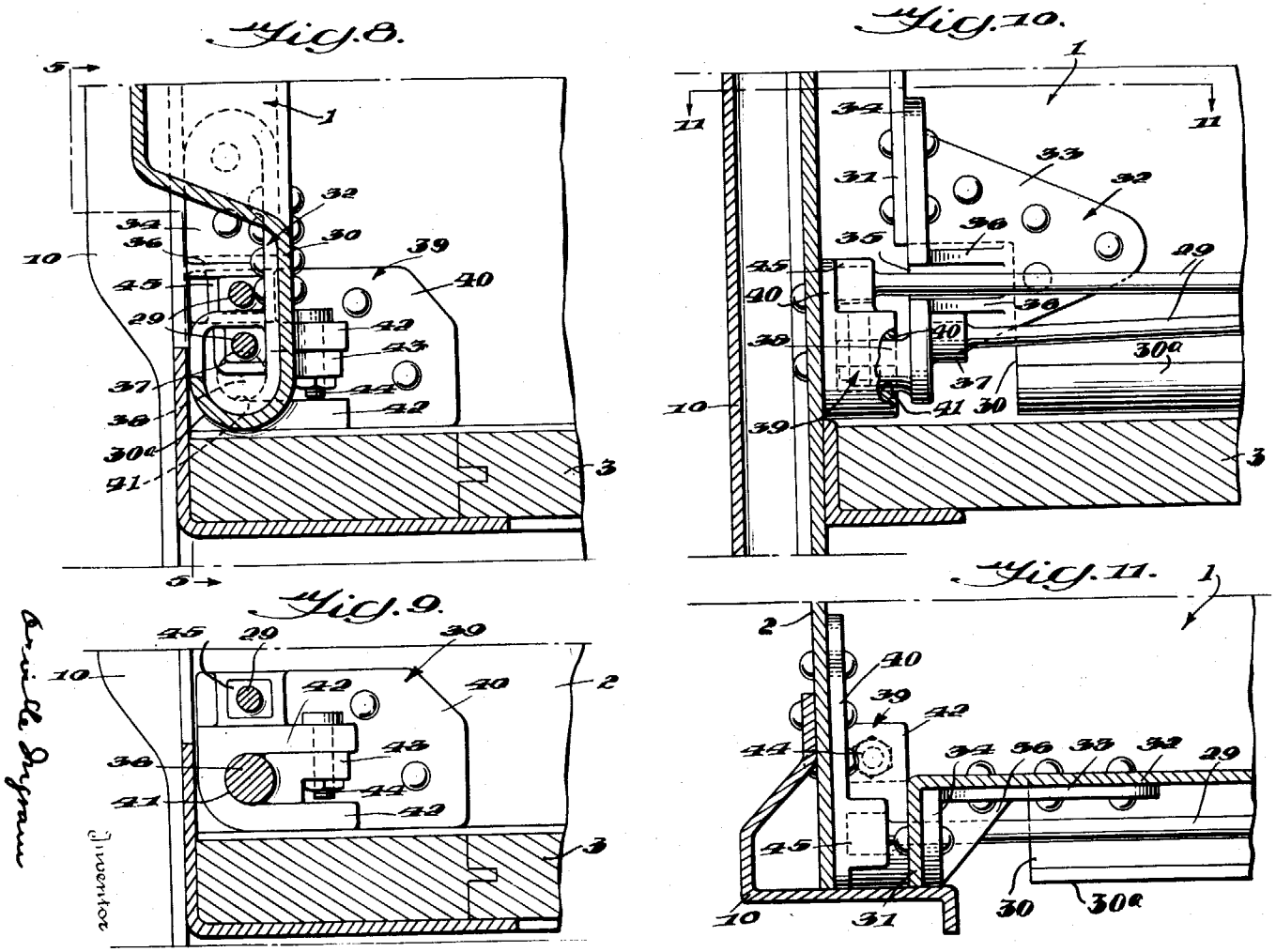
Inventor
Orville Ingram
By Ritter, Meeklen & Mills
Attorneys April 20, 1954 O. INGRAM Re. 23,814

DROP END GONDOLA CAR

Original Filed Feb. 14, 1946 6 Sheets-Sheet 5

Inventor

Orville Ingram

By Rutter, Mechlen & Munn
Its Attorneys

April 20, 1954 O. INGRAM Re. 23,814

DROP END GONDOLA CAR

Original Filed Feb. 14, 1946 6 Sheets-Sheet 6

Inventor

Orville Ingram

By Ritter, Mechlen & Meier

Its Attorneys

Reissued Apr. 20, 1954 Re. 23,814

UNITED STATES PATENT OFFICE 23,814

DROP END GONDOLA CAR

Orville Ingram, Pinecrest, Va., assignor to Unitcast Corporation, Toledo, Ohio, a corporation of Ohio Original No. 2,567,287, dated September 11, 1951, Serial No. 647,608, February 14, 1946. Application for reissue April 16, 1952, Serial No. 282,562

12 Claims. (Cl. 105—406)

Matter enclosed in heavy brackets [ ] appears in the original patent but forms no part of this reissue specification; matter printed in italics indicates the additions made by reissue.

My invention relates to railway freight cars and particularly to gondola cars having doors hinged to the car body in a manner requiring that their swinging movement from open position to closed position be performed in opposition to the action of gravity.

The invention is particularly useful in connection with the drop end doors of gondola cars which commonly weigh approximately 850 pounds apiece. Considerable difficulty is, therefore, usually experienced in moving the doors upwardly from their horizontal open positions to their closed vertical positions. Two or more workmen are required to effect closure of these drop end doors or else some mechanical means, such, for example, as a crane which is not often available, must be employed.

The principal object of the invention is to provide simple and effective mechanism capable of practical application to a railway car, for imparting to a hinged car door, whose swinging movement from open position to closed position is opposed by the action of gravity, a force generated by the opening movement of the door itself which tends to force the door toward closed position.

A primary feature of the invention consists in providing a railway car door with a pair of brackets secured to the door adjacent the sides thereof and a pair of brackets immovably secured to the car body adjacent the sides of the door, a torsion rod being connected to the door bracket at one side of the door and being connected to the car bracket at the opposite side thereof so that, when the door is moved to open position, the rod is energized to provide a force tending to return the door to closed position.

Another feature of the invention consists in providing a door with a pair of relatively inclined torsion rods adjacent the hinged edge thereof which are respectively connected at their opposite ends to the door and to the car body adjacent the opposite edges of the door so that opening movement of the door will energize the rods to provide a force tending to return the door to closed position.

A further feature of the invention consists in providing the side walls of a railway gondola car adjacent opposite side edges of a drop end door with portions to which the ends of torsion rods arranged adjacent the hinged edge of the door may be connected.

A further feature of the invention consists in so forming the ends of the torsion rods secured to the car body that they serve as pivotal mountings for the door.

A still further feature of the invention consists in arranging a torsion rod which tends to return the hinged door toward closed position on the outside of the door where it will not come in contact with lading within the car.

A still further feature of the invention consists in providing a pivoted railway car door with a pair of torsion rods whose opposite ends are respectively connected to brackets carried by the door and to brackets mounted on the car body, the brackets on the door being formed with laterally projecting pintles for hingedly associating the door with the car.

Still another feature of the invention consists in providing a drop end door of a gondola car with brackets adjacent the lower corners thereof respectively having hub portions engageable with the floor of the car and affording a rotatable support for the door.

Still another feature of the invention consists in providing a drop end door of a railway gondola car with a pair of relatively inclined torsion rods whose opposite ends are adapted to be immovably secured to the door and the car body and in providing the door with brackets having hub portions affording a pivotal support for the door, the central portions of the hubs being apertured to permit the passage of the torsion rods therethrough for connection to the car body.

Other and more specific features of the invention, residing in advantageous forms, combinations and relations of parts, will hereinafter appear and be pointed out in the claims.

In the drawings, illustrating three embodiments of the invention,

Figure 2 is a sectional view taken on line 2—2 of Figure 1.

Figure 1:
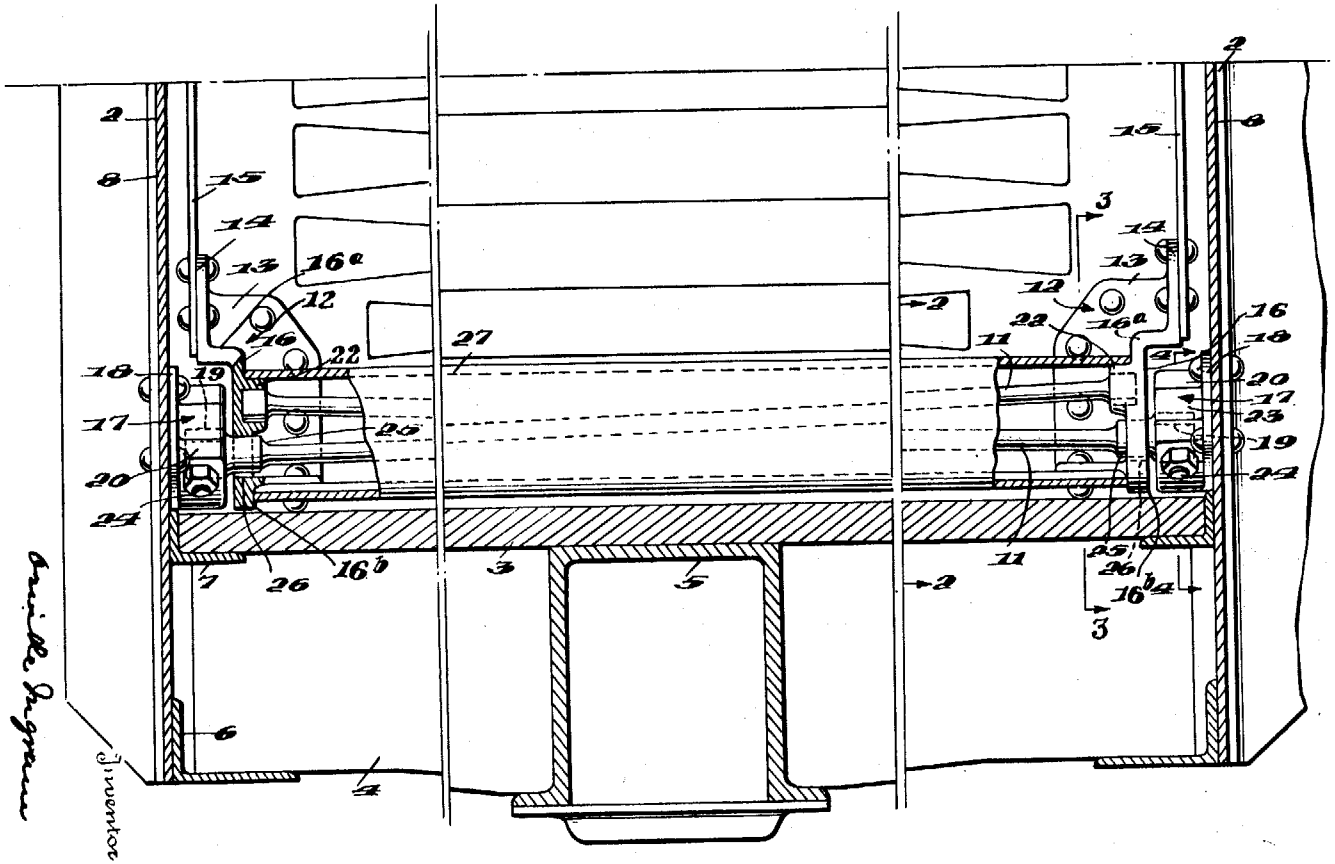
Figure 1 is a vertical transverse sectional view of a railway gondola car showing the lower portion of a drop end door provided with one form of the invention.

Figures 3 and 4 are enlarged fragmentary sectional views taken on lines 3—3 and 4—4, respectively, of Figure 1.

Figures 5, 6, 7:
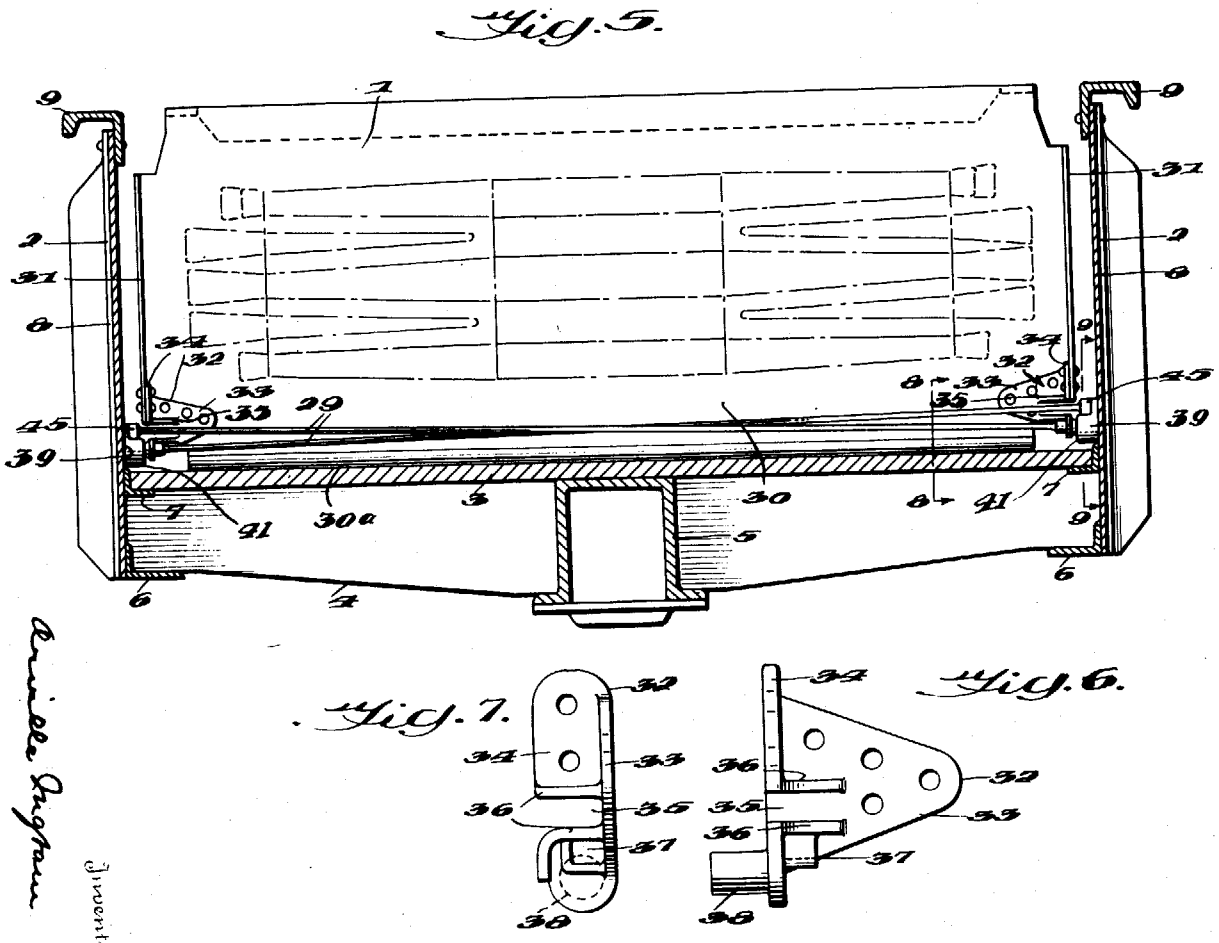

Figure 5 is a view similar to Figure 1 illustrating another form of the invention applied to the outer face of the drop end door, the lower portion of the view being taken on a line corresponding to line 5—5 of Figure 8 and the side walls of the car being shown in section.

Figure 6 is an enlarged front view of one of the castings which are secured to the door at the lower corners thereof.

Figure 7 is an end view of the casting shown in Figure 6.

Figures 8 and 9 are enlarged detail sectional views on lines 8—8 and 9—9, respectively, of Figure 5.

Figure 10 is an enlarged view adjacent one corner of the door as seen from the outside of the car.

Figure 11 is a sectional view taken on line 11—11 of Figure 10.

Figure 12:
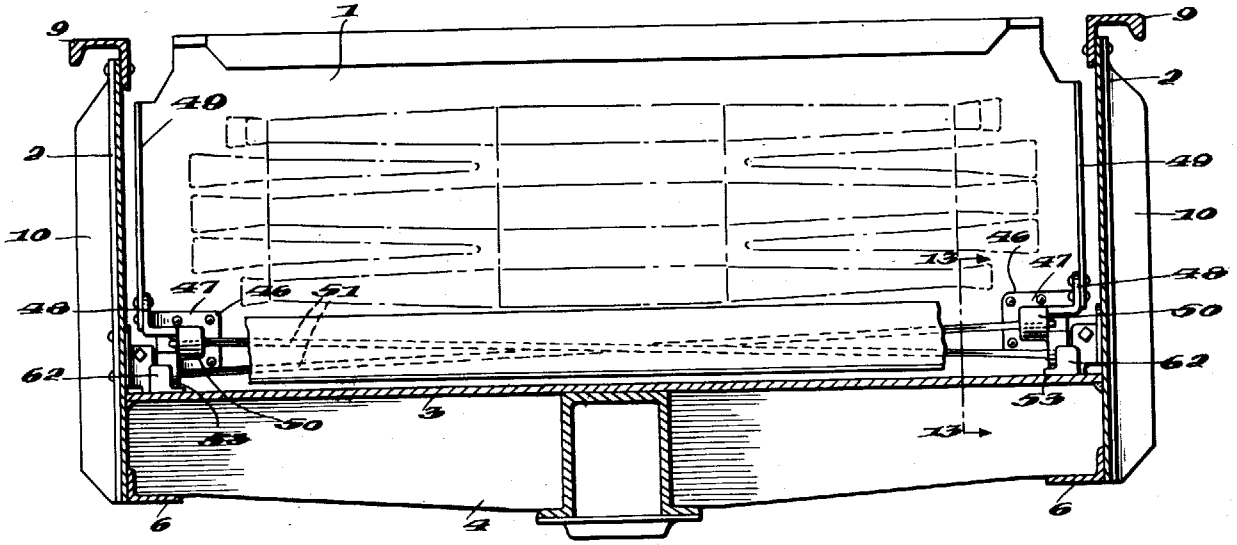

Figure 12 is a view similar to Figure 1 illustrating a third embodiment of the invention.

Figure 13:
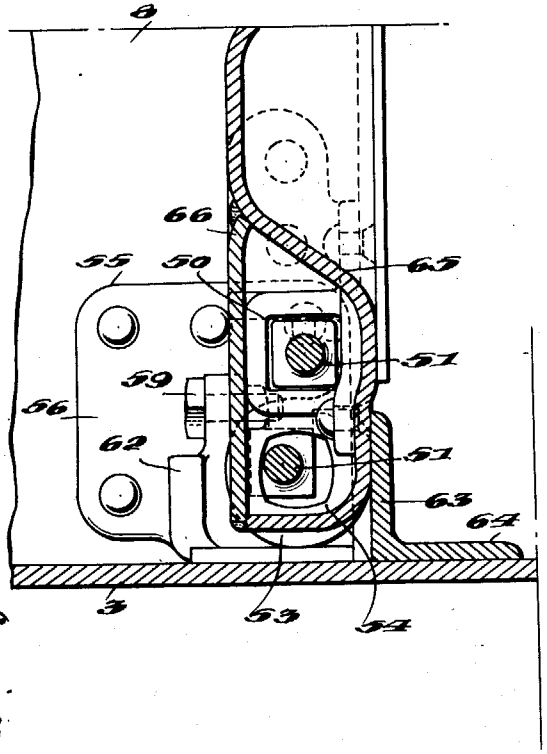

Figure 13 is an enlarged sectional view taken on line 13—13 of Figure 12.

Figure 14:
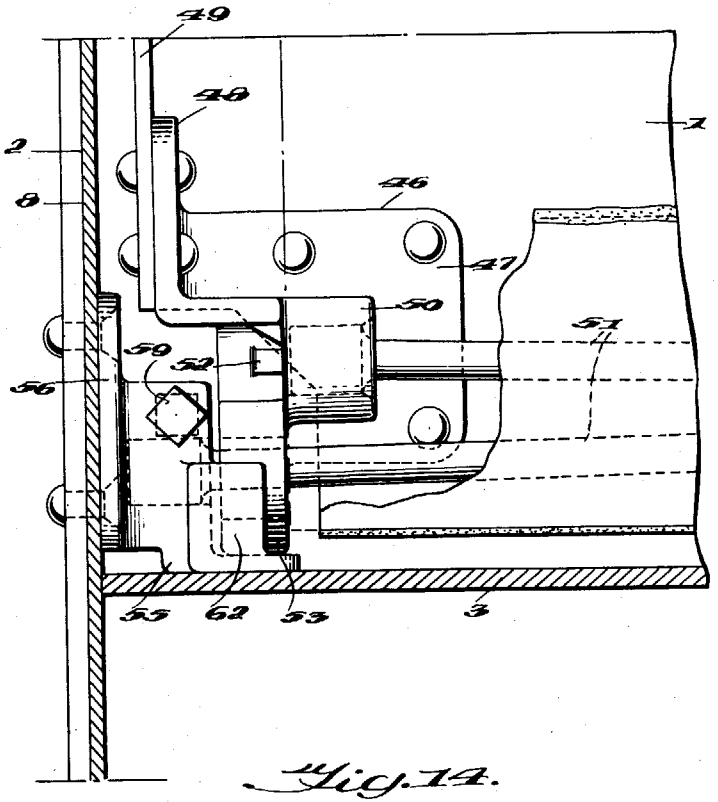

Figure 14 is an enlarged view adjacent a lower corner of the door.

Figure 15:
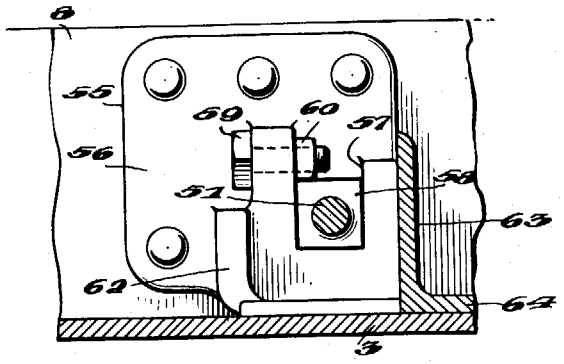

Figure 15 is an enlarged sectional view showing one of the brackets secured to the car body and the adjacent end of the torsion rod connected thereto.

Referring more particularly to Figures 1 to 4 of the drawings illustrating one form of the invention, 1 indicates the drop end door of a railway gondola car having sides 2, a floor 3 and an underframe 4 of usual construction.

The underframe consists of a center sill 5 and side sill members which include side sills 6 and floor supporting angles 7. The floor is preferably formed by a plurality of transversely extending wood planks or boards which are supported at their ends on the horizontal inturned flanges of the floor supporting angles. The side walls of the car are of conventional construction comprising side sheets 8 which, together with conventional side stakes are rigidly secured at their lower portions to the side sill members 6 and *supporting angles* 7. The upper portions of the side sheets and side stakes are secured to top chords or bulb angles 9 shown in Figures 5 and 12 of the drawings.

At their ends, each side wall is provided, as usual, with corner posts 10 having portions affording an abutment or stop for the end door when in upright closed position. As is well known, the doors are held in closed positions by mechanism (not shown) carried by the side walls adjacent the ends thereof.

Extending transversely of the door adjacent the lower edge thereof are a plurality of torsion rods 11 which are so connected to the door and to adjacent parts of the car body that, when the door is moved toward open position, the rods are twisted and thereby exert a force tending to return the door toward closed position. At its lower corners, the drop end door is provided with brackets 12 each of which has a plate portion 13 rigidly secured to the main body portion of the door and an angularly disposed plate portion 14 rigidly secured to inturned side flanges 15 of the door. The plate [portions] *portion* 14 *of each door bracket 12 is* [are] offset inwardly, as indicated at *16ᵃ in Fig. 1* [16], to provide substantially *disc-like portion 16 parallel to the plate portion 14 and extending* [parallel portions which extend] downwardly to the bottom of the door.

Adjacent the side edges of the door and extending inwardly into the spaces afforded by the offsets in the plate portions 14 of the door brackets are brackets 17 which are immovably connected to the car body, being preferably secured to the side walls 8 of the car. As seen in Figure 4, each of the car brackets *17* preferably includes a plate portion 18 for attachment to the adjacent side of the car and a polygonal recess 19 of substantially U shape defined by upwardly inclined sides 20 which are connected at their lower ends by a wall 21.

One of the ends of the torsion rods 11 fit within the polygonal recesses 19 in the car brackets *17* while the opposite ends of the rods fit within inwardly opening polygonal sockets 22 in the inwardly offset *disc-like* portions *16* of the car brackets *17*. The ends of the rods within the recesses 19 may be removably secured therein by a block 23 securely held in position by a bolt 24.

Just inwardly of the car brackets 17, the ends of the torsion rods *11*, which are connected thereto, are formed with circular portions 25 of greater diameter than the rods themselves which are disposed within circular openings 26 formed in the inwardly offset portions *16* of the door brackets *12* below the sockets 22. These enlarged circular portions 25 of the rods form pivotal mountings for the door on which the door is pivotally supported, it being seen from the drawings that the lowermost portions *of the disc-like extensions 16* of the door brackets *12* and of the door itself are positioned sufficiently above the floor 3 that the door may freely rotate on the portions 25. *It will be also seen that at least the peripheral edge surfaces 16ᵇ of the disc-like extensions 16 are concentric to the axis of the pivotal door mounting portions 25 so that the surface 16ᵇ will ride upon or wipe over any object lodged between them and the floor 3 of the car.*

As the opposite ends of each rod *11* are respectively held by one of the door brackets *12* and *by* the car bracket *17* adjacent the opposite edge of the door, the rods will be twisted when the door is moved from its closed upright position toward its horizontal *open* [closed] position. Thus movement of the door from closed to open position energizes the torsion rods so that a force is set up in them tending to move the door toward closed position.

To prevent lading from contacting the torsion rods and thereby possibly injuring them and preventing them from acting in the manner desired, they are preferably enclosed by *an elongated horizontally disposed cover plate* [a cover] 27 which may be welded *at its upper edge* to the door adjacent [its upper edge] and which at its lower edge may be conveniently riveted to an inturned flange 28 of the door*; or the lower end of the door may be provided with a rounded bottom edge 30ᵃ, as shown in Figs. 5 to 11, extending between the door brackets 12 and conforming with the peripheral edges 16ᵇ of the disc-like portions 16 of said brackets so as to be concentric with the axes of the door mounting portions 25 of the rods 11, to prevent jamming of the door in its opening and closing movements by lading or other objects lying between the lower edge of the door and the floor 3 of the car body as said surface will wipe over or upon any such objects therebeneath while protecting the torsion rods from lading within the car.*

The form of the invention illustrated in Figures 5 to 11, inclusive, is applied to a railway gondola car having generally the same structural features as the car illustrated in the form of the invention just described and corresponding features of the two cars are, therefore, designated by similar reference numerals.

In this embodiment of the invention, the torsion rods 29 *corresponding to the tension rods 11 in Figures 1 to 4 inclusive,* are arranged on the outer face of the door instead of the inside face where the lading within the car will be unable to contact them. The positioning of the rods on the outer face of the door, without decreasing the lading carrying capacity of the car, is accomplished by arranging the rods in an outwardly opening corrugation 30 at the lower edge of the door. Instead of being provided with the customarily inturned *side* flanges [thereof] *15 as shown in Figures 2 and 3*, the drop end door is provided with outturned side marginal flanges 31.

Positioned at the lower corners of the door are brackets 32 each of which is formed with a plate portion 33 secured to the main body portion of the door and with an outwardly extending plate portion 34 secured to the adjacent side flange 31. The plate portions 34 of the *door* brackets *32* are recessed, as indicated at 35, and on opposite sides thereof the plates *34* are connected to the main plates 33 of the brackets *32* by substantially triangular reinforcing flanges 36.

Positioned in each of the recesses 35 is one end of one of the torsion rods 29 which extends toward the adjacent side wall of the car and is rigidly connected therewith. Projecting from one side of the portion of [the] *each* plate 34 below the recess 35 is a polygonal socket 37 for receiving the corresponding end of the other torsion rod *29*. Projecting from the opposite side of the lower portion of *each* [the] plate portion 34 is a trunnion or hinge pintle 38.

The trunnions *38* of the brackets *32* secured to the door are rotatably supported in brackets 39 carried by the car body. Each of the *car* brackets 39 preferably includes a plate portion 40 adapted to be rigidly secured to the adjacent side wall of the car and a substantially U-shaped recess 41 (*Fig. 9*) having substantially horizontally arranged arms or legs 42. The trunnions 38 (*Figs. 6 to 10*) extend into the U shape recesses 41 and are removably secured therein by brackets 43 connected by bolts 44 or other suitable means to one of the arms 42 (*Fig. 9*). Above the recesses 41, each of the car brackets 39 is formed with a polygonal socket 45 for receiving the correspondingly shaped end of the torsion rod which extends through the recess 35 in the car bracket.

As in the embodiment of the invention heretofore described, the opposite ends of the torsion rods *29* are *likewise* respectively securely held in the door brackets 32 and in the car brackets 39 so that, when the door is swung inwardly from its upright closed position, the rods are twisted and thereby provide a force tending to return the door to closed position.

As the trunnions 38, bearing in the recesses 41 in the car bracket 39, support the entire weight of the door, the lower edge of the door *30a* may be conveniently curved outwardly and upwardly *to be substantially semi-circular and substantially concentric with the axis of the trunnions 38*, as indicated in Figure 8 [.], *the torsion rods or members 29 being disposed above the inner concaved portion of said semi-circular portion 30a—all preferably within the plane of the door 1. Thus, as can be particularly observed from Figures 8 and 10, the torsion members 29 are protected and shielded from contact with the lading and* no portion of the door adjacent its hinged *lower* edge [with the exception of the trunnions 38] engages the car floor as the door is being swung to either opened or closed position [.] and, *should pieces of lading (such as rock, coal, brick or other small objects) become lodged beneath the door, the rounded or semi-circular bottom end or edge 30a will wipe or move over such piece of lading with a rotary motion, even if in contact therewith, thereby preventing said lading from jamming the door and preventing its opening and closing movements.*

In the embodiment of the invention illustrated in Figures 12 to 16, the railway gondola car illustrated is of substantially the same construction as the gondola car illustrated in the first described embodiment of the invention and corresponding features of car construction are, therefore, designated with corresponding reference numerals. The floor of the car, however, in this embodiment of the invention is shown as being formed of metal plate instead of wood, and it may be conveniently connected to the side walls of the car by welding or any other suitable means.

The brackets secured to the lower corners of the door and designated by the reference numeral 46 are each formed with a plate portion 47 secured to the main body of the door and with an angularly disposed plate portion 48 secured to the adjacent inturned flange 49 of the door. The side plate portions 48 of the brackets angle inwardly and form the top walls of sockets 50 for receiving one end of each of the torsion rods 51. The sockets 50 are preferably open at both ends and triangular flanges [51] *52* are positioned at the outer ends thereof to prevent the cooperating torsion rods 52 from being pushed all the way through the socket.

Below the sockets 50, the door brackets are provided with hub portions 53 whose peripheries engage the floor of the car and, therefore, afford a rotatable support. The central portion of each of the hubs 53 is apertured as at 54 through which the corresponding end of the other torsion rod extends for connection to the car body.

Positioned at opposite sides of the door are brackets 55 preferably having plate portions 56 by which the brackets may be secured to the car sides. Each bracket 55 has an upwardly opening recess 57 for receiving the polygonal end 58 of the torsion rod which extends through the opening in the central portion of the hub of the adjacent door bracket. Rotatably mounted in one of the walls of the recess 57 is a bolt 59 having a nut 60 which overlies the adjacent end of the torsion rod and retains it in the recess. Each of the car brackets may also be provided with an upstanding wall or flange 62 which is adapted to partially overlap the hub portions 53 of the brackets 46. The walls 62 of the brackets are spaced sufficiently from the upstanding legs 63 of an end angle 64 to receive the hub portions of the door brackets and to prevent lateral shifting thereof.

The inwardly opening corrugation 65 at the bottom of the door in which the torsion rods are disposed may be conveniently closed by a cover plate 66 to protect the rods from lading within the car.

Various modifications may be made in the structural details of the embodiments of the invention illustrated without departing from the spirit and scope of the invention as defined in the appended claims.

What I claim is:

1. In a railway car having an underframe and a body supported thereby, the combination with an end door whose swinging movement to closed position is opposed by the action of gravity, of a pair of relatively inclined torsion rods extending transversely of the door adjacent the lower edge thereof, a pair of brackets rigidly secured to the door adjacent opposite sides thereof, and brackets rigid with said car body respectively adjacent said brackets on the door, one end of each rod being rigid with one of the brackets secured to the door and the opposite end of each rod projecting beyond the bracket secured to the opposite side of the door into engagement with the bracket mounted on said car body adjacent the opposite side of the door, the portions of said rods that engage the car body brackets serving as hinge members for said door, when the door is swung to open position the rods are twisted and thereby exert a force tending to move the door toward closed position.

2. A door mechanism for the drop end door of a railway gondola car involving a pair of relatively inclined torsion rods extending transversely of the door adjacent the lower edge thereof, brackets rigid with the lower corners of the door respectively having portions provided with means to which one of the ends of each of said torsion rods is connected, and brackets respectively immovably secured to the car outwardly of said door said brackets on the door respectively having portions through which the opposite ends of said torsion rods extend for connection to the brackets on the car so that when the door is moved toward open position the rods are energized to provide a force tending to return the door to closed position, the portions of said rods that engage the car body brackets serving as hinge members for said door.

3. A door mechanism for the drop end door of a railway gondola car involving a pair of relatively inclined torsion rods extending transversely of the door adjacent the hinged edge thereof, brackets rigid with the lower corners of the door, and brackets rigid with the car body and respectively disposed adjacent the side edges of the door, the opposite ends of each rod being respectively connected to a bracket on the door and to the bracket on the car adjacent the opposite side of the door, the portions of said rods adjacent the ends thereof connected to the brackets on the car affording a pivotal support for the door.

4. A door mechanism for the drop end door of a railway gondola car involving a pair of relatively inclined torsion rods extending transversely of the door adjacent the hinged edge thereof, brackets rigid with the lower corners of the door, and brackets rigid with the car body respectively adjacent the side edges of the door, the brackets on the door respectively having apertured portions through which one end of each of said rods extends, the opposite ends of each of said rods being respectively connected to one of the brackets on the door and to the bracket on the car at the opposite side of the door, the portions of the rods extending through the said apertures in the car brackets affording pivotal supporting means for the door.

5. In a door mechanism for the drop end door of a railway gondola car involving a pair of relatively inclined torsion rods extending transversely of the door adjacent its lower edge, brackets respectively secured to the lower corners of the door, and brackets immovably mounted on the car body respectively adjacent the sides of the door, said rods being respectively provided with polygonal end portions, each of said brackets being provided with means for engaging one of said polygonal portions to hold it against rotation with respect thereto so that when the door is moved to open position said rods will be energized to provide a force tending to return the door to closed position, brackets secured to the door respectively having recessed portions permitting said rods to extend beyond them into engagement with the brackets on the car body, the portions of said rods that engage the car body brackets serving as hinge members for said door.

6. In a door mechanism for the drop end door of a railway gondola car involving a pair of relatively inclined torsion rods extending transversely of the door adjacent its lower edge, brackets rigidly secured to the adjacent sides thereof and respectively having portions offset inwardly from the sides of the door, and brackets rigid with the car body adjacent opposite side edges of the door and respectively provided with portions projecting into the spaces afforded by said offset portions of the brackets secured to the door, one end of each torsion rod being anchored in the offset portion of one of the door brackets and the other end thereof being anchored in the bracket on the car at the opposite side of the door whereby said rods will be energized upon an opening movement of the door to provide a force tending to return the door to closed position, the portions of said rods that engage the car body brackets serving as hinge members for said door.

7. In a door mechanism for the drop end door of a railway gondola car involving a pair of relatively inclined torsion rods extending transversely of the door adjacent its lower end, brackets secured to the door adjacent opposite sides thereof, and brackets secured to the car body respectively adjacent the side edges of the door, each of the brackets secured to the car body having an upwardly opening recess, the opposite ends of each rod being respectively connected to one of the brackets on the door and to the bracket on the car at the opposite side of the door, and removable means closing the upper end of the recess of each of the brackets secured to the car body for locking the adjacent end of the torsion rod in said recess, the portions of said rods that engage the car body brackets serving as hinge members for said door.

8. In a door mechanism for the drop end door of a railway gondola car involving a pair of relatively inclined torsion rods extending transversely of the door adjacent its lower edge adapted to exert a force tending to move the door toward closed position when it is opened, said rods being provided at each end with a polygonal portion, brackets respectively secured to the lower corners of the door, and brackets respectively secured to the car body adjacent opposite sides of the door, each of the brackets on the door having a polygonal recess for receiving one end of one of said rods and also having a recessed portion through which the corresponding end of the other rod extends so that it may be anchored to the adjacent bracket on the car body, the portions of said rods that engage the car body brackets serving as hinge members for said door.

9. In a door mechanism for the drop end door of a railway gondola car involving a pair of relatively inclined torsion rods extending transversely of the door adjacent its lower edge, brackets respectively secured to the lower corners of the door, and brackets secured to the car body adjacent opposite sides of the door, each of the brackets on the car respectively having an upwardly opening recess for receiving one end of one of the torsion rods, and means associated with each recess for preventing upward movement of the end of the torsion rod disposed therein, the portions of said rods that engage the car body brackets serving as hinge members for said door.

*10. A door mechanism for the drop end door of a railway gondola car involving a pair of relatively inclined torsion rods extending transversely of the door adjacent the hinged edge thereof, brackets rigid with the lower corners of the door, and brackets rigid with the car body and respectively disposed adjacent the side edges of the door, the opposite ends of each rod being respectively connected to a bracket on the door and to the bracket on the car adjacent the opposite side of the door the portions of said rods adjacent the ends thereof connected to the brackets on the car affording a pivotal support for the door, said door having at its bottom edge a rounded outer surface facing a floor of said car body, said surface underlying said torsion rods and being concentric with the said pivotal axis of said door whereby said rounded bottom edge surface of the door will rotate with a wiping movement with respect to lading that may be beneath said rounded outer surface when said door is swung.*

*11. A door mounting mechanism for a drop-end door of a railway gondola car comprising spaced brackets rigid with the car-body, brackets rigid with the lower corners of the door and between said car-body brackets, adjacent door and car body brackets being pivotally inter-connected and said door brackets pivoting on a common axis for pivotally mounting said door to said car-body, and torsion rod means extending across the lower portion of the door and anchored to act against the car body through the car-body brackets for generating force upon opening of said door to assist in the closing thereof, said door having at its bottom edge a rounded outer surface facing a floor of said car body, said surface underlying said torsion rod means and being concentric with said pivotal axis of said door.*

*12. A door mounting mechanism for a drop-end door of a railway gondola car comprising spaced brackets rigid with the car-body, brackets rigid with the lower corners of the door and between said car-body brackets, adjacent door and car body brackets being pivotally inter-connected and said door brackets pivoting on a common axis for pivotally mounting said door to said car-body, torsion rod means extending across the lower portion of the door and anchored to act against the car body through the car-body brackets for generating force upon opening of said door to assist in the closing thereof, said door having its bottom end formed as a semi-circular member extending along said bottom and outwardly of the inner face of the door and underlying and shielding said torsion rod means from lading within the car and providing a rounded bottom edge surface for said door facing a floor of said car-body and concentric with its hinging movement, whereby said rounded edge surface will rotate about said pivotal axis of the door with a wiping movement with respect to lading that may be beneath said surface, when said door is swung, and prevent jamming of the door in its opening and closing movements.*

References Cited in the file of this patent or the original patent

UNITED STATES PATENTS

| Number | Name | Date |
|---|---|---|
| 199,383 | Steinhoff | Jan. 22, 1878 |
| 514,076 | Hotz | Feb. 6, 1894 |
| 781,643 | Edwards | Feb. 7, 1905 |
| 1,119,940 | Edwards | Dec. 8, 1914 |
| 2,061,318 | Gilpin | Nov. 17, 1936 |
| 2,167,427 | Tatum | July 25, 1939 |
| 2,205,823 | Rice | June 25, 1940 |
| 2,452,163 | Swann | Oct. 26, 1948 |
| 2,580,760 | Goodwin | Jan. 1, 1952 |